US012152834B2

(12) United States Patent
Zheng et al.

(10) Patent No.: US 12,152,834 B2
(45) Date of Patent: Nov. 26, 2024

(54) SYSTEM AND METHOD FOR SUPPLYING BACKUP PRODUCTION IN AIR SEPARATION DEVICE

(71) Applicant: L'Air Liquide, Societe Anonyme pour l'Etude et l'Exploitation des Procedes Georges Claude, Paris (FR)

(72) Inventors: Haozhuan Zheng, Hangzhou (CN); Fei Gao, Hangzhou (CN)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 263 days.

(21) Appl. No.: 16/958,642

(22) PCT Filed: Dec. 26, 2017

(86) PCT No.: PCT/CN2017/118596
§ 371 (c)(1),
(2) Date: Jun. 26, 2020

(87) PCT Pub. No.: WO2019/127009
PCT Pub. Date: Jul. 4, 2019

(65) Prior Publication Data
US 2020/0333070 A1 Oct. 22, 2020

(51) Int. Cl.
*F25J 3/04* (2006.01)
*F17C 9/02* (2006.01)
*F17C 9/04* (2006.01)

(52) U.S. Cl.
CPC ............. *F25J 3/04478* (2013.01); *F17C 9/02* (2013.01); *F17C 9/04* (2013.01); *F25J 3/04781* (2013.01);
(Continued)

(58) Field of Classification Search
CPC .. F25J 3/04478; F25J 3/04781; F25J 3/04824; F25J 3/05427; F25J 2235/50;
(Continued)

(56) References Cited

U.S. PATENT DOCUMENTS 6,129,778 A * 10/2000 Garnier ................ F25J 3/04557 75/548
7,870,759 B2 1/2011 Peyron
(Continued)

FOREIGN PATENT DOCUMENTS

CN 1 795 359 6/2006
CN 202 420 113 9/2012
(Continued)

OTHER PUBLICATIONS

Supplementary EP Search Report for EP 17 93 6933, mailed Jul. 8, 2021.
(Continued)

*Primary Examiner* — John F Pettitt, III
(74) *Attorney, Agent, or Firm* — Justin K. Murray

(57) ABSTRACT

A system and method for supplying a backup product in an air separation device, as well as a system and method for supplying a lower-pressure product to a user by means of pressurization of a cryogenic liquid pump during normal operation of an air separation device, i.e., when the cryogenic liquid pump is in the cold standby state. By means of the system and method, a cryogenic liquid product taken from a storage tank is pressurized by the cryogenic liquid pump to produce a lower-pressure product by taking full
(Continued)

advantage of the low-speed operation of the cryogenic liquid pump in the cold standby state, and the lower-pressure product is transmitted to product supply lines of a user, to achieve the function of supplying the lower-pressure product to the user. The system and method not only reduce the energy loss of the cryogenic liquid pump in the cold standby state for a long time, but also avoid the bleeding rate of the cryogenic liquid product generated by sending a part of the cryogenic liquid product back to the storage tank, so that the advantage of quickly starting the cryogenic liquid pump from the cold standby state is ensured, and the requirements of the user to the higher-pressure product and the lower-pressure product can be satisfied.

13 Claims, 1 Drawing Sheet

(52) U.S. Cl.
CPC ........ *F25J 3/04824* (2013.01); *F25J 2235/50* (2013.01); *F25J 2245/50* (2013.01); *F25J 2290/62* (2013.01)

(58) Field of Classification Search
CPC .. F25J 2245/50; F25J 2290/62; F25J 2235/02; F17C 9/02; F17C 9/04
See application file for complete search history.

(56) References Cited

U.S. PATENT DOCUMENTS

| | | | | |
|---|---|---|---|---|
| 2006/0010909 | A1 | 1/2006 | Briglia et al. | |
| 2007/0044506 | A1 | 3/2007 | Peyron | |
| 2008/0184736 | A1 | 8/2008 | Peyron | |
| 2010/0230872 | A1* | 9/2010 | Devaux | F25J 3/04606 266/144 |
| 2016/0161180 | A1 | 6/2016 | Parsnick et al. | |
| 2016/0186930 | A1* | 6/2016 | Parsnick | F17C 9/02 62/50.2 |

FOREIGN PATENT DOCUMENTS

| | | |
|---|---|---|
| CN | 203 837 412 | 9/2014 |
| CN | 105 043 013 | 11/2015 |
| CN | 106 839 652 | 6/2017 |
| JP | 2013 170 623 | 9/2013 |
| JP | 2014 065 619 | 4/2014 |

OTHER PUBLICATIONS

International Search Report and Written Report for PCT/CN2017/118596, mailed Jul. 26, 2018.

* cited by examiner

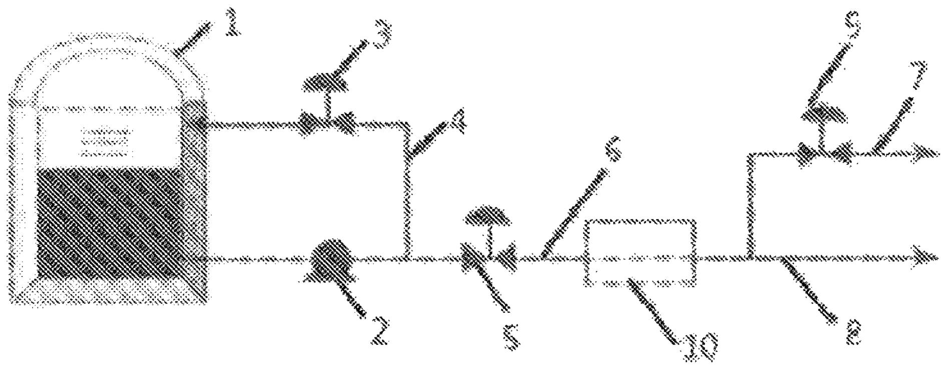
1
3
4
9
7
6
2
5
10
8

SYSTEM AND METHOD FOR SUPPLYING BACKUP PRODUCTION IN AIR SEPARATION DEVICE

CROSS REFERENCE TO RELATED APPLICATIONS

This application is a § 371 of International PCT Application PCT/CN2017/118596, filed Dec. 26, 2017, which is herein incorporated by reference in its entirety.

TECHNICAL FIELD OF THE INVENTION

The present invention relates to a system and method for supplying a backup product in an air separation apparatus, in particular to a system and method for supplying a low-pressure product to a user after pressurization by a cryogenic liquid pump, during normal operation of the air separation apparatus, i.e. when the cryogenic liquid pump is in a cold standby state.

BACKGROUND OF THE INVENTION

Users of industrial gases generally have stringent requirements for pressure variation in gas apparatuses producing pressurized products. That is to say, when an industrial apparatus is unavoidably shut down, e.g. when an air separation apparatus is shut down for overhaul periodically or shuts down unexpectedly due to a fault, the pressure of the air separation apparatus should be kept within a relatively stringent range of variation. Similarly, in the case of other gas apparatuses, pressure fluctuation in the apparatus and the user's product supply pipeline should also be reduced as much as possible, such that the pressures of the apparatus and the pipeline are kept within the required range.

In an air separation apparatus, an internal compression process may be used to obtain a pressurized cryogenic liquid product directly at a cold box outlet. The cryogenic liquid product is extracted from a distillation tower, a separation tank or a container. The cryogenic liquid product, e.g. cryogenic liquid oxygen, is then further pressurized to the required pressure by a cryogenic liquid pump, and is vaporized by heat exchange to form pressurized gaseous oxygen to be supplied to the user.

In some applications, intermittent interruptions in the supply of gas products are not permitted. A supply fault is caused by shutdown of the air separation apparatus; the shutdown may be caused by the purity of a gas product failing to meet requirements, or by a key component (e.g. compressor or turbine accident shutdown). To ensure that the gas product is delivered under pressure, a cryogenic liquid product produced by the air separation apparatus during normal operation is accumulated in advance and stored in a backup storage tank; when the air separation apparatus shuts down or the operation thereof slows down, the gas product passes through a backup system composed of the storage tank, a cryogenic liquid pump and various types of vaporizers, to ensure continued supply. The switchover from normal operation to a backup state will generally cause pressure variation in the user's product supply pipeline.

In order to satisfy the user's stringent requirements for pressure variation, especially pressure variation in the user's product supply pipeline when the air separation apparatus shuts down or the operation thereof slows down, an improved solution for cold standby has been proposed. In the solution, a backup cryogenic liquid pump is driven by a variable speed motor, and maintains low-speed running during normal operation of the air separation apparatus; a portion of the cryogenic liquid product is extracted from the storage tank and circulated back to the storage tank via the cryogenic liquid pump and a liquid back-flow control valve. When the air separation apparatus shuts down or the operation thereof slows down, the cryogenic liquid pump driven by the variable speed motor changes from low-speed running to high-speed running; the cryogenic liquid product is extracted from the storage tank and passes through the backup cryogenic liquid pump and a liquid pump outlet control valve; the cryogenic liquid product is pressurized to the required high pressure, and is vaporized by heat exchange to form a high-pressure gas, such as gaseous oxygen to be supplied to the user. The solution has the advantage of a fast response speed, and can minimize the startup time of the cryogenic liquid pump and vaporizer.

However, in a cold standby state, a small amount of the portion of the cryogenic liquid product that is extracted from the storage tank and circulated back to the storage tank will be vaporized and released into the air, resulting in a loss of liquid and energy. Although the loss is small for this portion, the wastage caused is considerable, because the air separation apparatus is operating normally for most of the time, i.e. the cryogenic liquid pump is in the cold standby state on a long-term basis.

SUMMARY OF THE INVENTION

An object of certain embodiments of the present invention is to overcome the shortcomings of the prior art by providing a system and method for supplying a low-pressure product to a user after pressurization by a cryogenic liquid pump, during normal operation of an air separation apparatus, i.e. when the cryogenic liquid pump is in a cold standby state. Through this system and method, it is possible to make full use of low-speed running of the cryogenic liquid pump when in the cold standby state; a cryogenic liquid product extracted from a storage tank is pressurized via the cryogenic liquid pump to produce a low-pressure product, which is delivered to a product supply pipeline of a user, thereby realizing the function of supplying the low-pressure product to the user. The present invention not only reduces the energy loss associated with the cryogenic liquid pump being in the cold standby state on a long-term basis, but also avoids the release of the cryogenic liquid product caused by this portion of the cryogenic liquid product being circulated back to the storage tank, ensuring the advantage of rapid startup of the cryogenic liquid pump from the cold standby state while also being able to satisfy the user's demand for a high-pressure product and a low-pressure product.

The abovementioned object is realized mainly through the following concept:

A system for supplying a backup product in an air separation apparatus, the system comprising:

- a storage tank for storing a cryogenic liquid product;
- a speed-adjustable cryogenic liquid pump, which pressurizes the cryogenic liquid product sent out from the storage tank;
- a liquid pump back-flow control valve, and a fluid circuit for extracting the cryogenic liquid product from the storage tank and sending same back to the storage tank via the speed-adjustable cryogenic liquid pump and the liquid pump back-flow control valve;
- a liquid pump outlet control valve, and a delivery pipeline which extracts the cryogenic liquid product from the storage tank and is connected to a product supply pipeline of a user via the speed-adjustable cryogenic liquid pump and the liquid pump outlet control valve;

and the product supply pipeline of the user located downstream of the delivery pipeline;

wherein the product supply pipeline of the user at least comprises a first product supply pipeline and a second product supply pipeline; the delivery pipeline is connected to the first product supply pipeline and the second product supply pipeline separately, and an operating pressure of the first product supply pipeline is lower than an operating pressure of the second product supply pipeline.

Preferably, the speed-adjustable cryogenic liquid pump is driven by a variable speed motor.

Preferably, the liquid pump outlet control valve can adjust the flow rate of the cryogenic liquid product passing through the delivery pipeline.

Preferably, the liquid pump back-flow control valve can adjust the flow rate of the cryogenic liquid product passing through the fluid circuit.

Preferably, a vaporizer, located between the liquid pump outlet control valve and the product supply pipeline of the user, is installed on the delivery pipeline, for the purpose of vaporizing the pressurized cryogenic liquid product, and thereby providing a pressurized gas product.

Preferably, the vaporizer is an air bath vaporizer or a water bath vaporizer.

Preferably, the first product supply pipeline comprises at least one depressurization device, for depressurizing a pressurized gas product or the cryogenic liquid product, sent out by the speed-adjustable cryogenic liquid pump and having a pressure higher than the operating pressure of the first product supply pipeline, to the operating pressure of the first product supply pipeline.

Preferably, the cryogenic liquid product is liquid oxygen, liquid nitrogen or liquid argon.

Preferably, the cryogenic liquid product is produced by the air separation apparatus.

The present invention also provides a method based on the system for supplying a backup product in an air separation apparatus of the system mentioned above, the method comprising:

separating air in the air separation apparatus to produce a cryogenic liquid product, which is delivered and stored in the storage tank, wherein:

(a) the cryogenic liquid product stored in the storage tank is provided;

(b) during normal operation of the air separation apparatus, after the cryogenic liquid product extracted from the storage tank has been pressurized via the speed-adjustable cryogenic liquid pump running at a low speed, at least a portion of the cryogenic liquid product is delivered to the first product supply pipeline via the delivery pipeline, by adjusting the liquid pump outlet control valve, the liquid pump back-flow control valve and/or the depressurization device;

(c) during temporary operation when the air separation apparatus shuts down or the operation thereof slows down, after the cryogenic liquid product extracted from the storage tank has been pressurized via the speed-adjustable cryogenic liquid pump running at a high speed, at least a portion of the cryogenic liquid product is delivered to the second product supply pipeline via the delivery pipeline, by adjusting the liquid pump outlet control valve, the liquid pump back-flow control valve and/or the depressurization device.

Preferably, the speed-adjustable cryogenic liquid pump is driven by a variable speed motor, and when a rotation speed of the variable speed motor is adjusted according to the operating pressure of the first product supply pipeline, the cryogenic liquid pump is caused to run at a low speed, pressurizing the cryogenic liquid product to a pressure approximately equal to the operating pressure of the first product supply pipeline; when the rotation speed of the variable speed motor is adjusted according to the operating pressure of the second product supply pipeline, the cryogenic liquid pump is caused to run at a high speed, pressurizing the cryogenic liquid product to the operating pressure of the second product supply pipeline; the operating pressure of the first product supply pipeline being lower than the operating pressure of the second product supply pipeline.

Preferably, the liquid pump back-flow control valve is closed, such that all of the pressurized cryogenic liquid product is delivered to the product supply pipeline of the user via the delivery pipeline.

Preferably, a vaporizer, located between the liquid pump outlet control valve and the product supply pipeline of the user, is installed on the delivery pipeline, for the purpose of vaporizing the pressurized cryogenic liquid product, and thereby providing a pressurized gas product.

Preferably, the vaporizer is an air bath vaporizer or a water bath vaporizer.

Preferably, the first product supply pipeline comprises at least one depressurization device, for depressurizing a pressurized gas product or the cryogenic liquid product having a pressure higher than the operating pressure of the first product supply pipeline, to the operating pressure of the first product supply pipeline.

Preferably, the cryogenic liquid product is liquid oxygen, liquid nitrogen or liquid argon.

Preferably, the cryogenic liquid product is produced by the air separation apparatus.

The present invention has the following beneficial effects in relation to the prior art:

1. At least one embodiment of the present invention makes full use of the low-speed running of the cryogenic liquid pump when in the cold standby state, realizing the function of supplying a low-pressure product to the user, and reducing the energy loss associated with the cryogenic liquid pump being in the cold standby state on a long-term basis.
2. At least one embodiment of the present invention avoids the release of the cryogenic liquid product caused by a portion of the cryogenic liquid product being circulated back to the storage tank.
3. At least one embodiment of the present invention ensures the advantage of rapid startup of the cryogenic liquid pump from the cold standby state while also being able to satisfy the user's demand for a high-pressure product and a low-pressure product.
4. Taking the prior art as a starting point, the object of at least one embodiment of the present invention can be achieved through simple modification of the product supply pipeline, so the at least one embodiment of the present invention has the characteristics of low investment of new equipment and convenient installation.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims or the way in which said claims refer back to one another.

Embodiments of the present invention are described further below with reference to the drawings, wherein:

The Figure is a schematic diagram of the connection of the constituent parts of a system for supplying a backup product in an air separation apparatus according to at least one embodiment of the present invention.

DETAILED DESCRIPTION OF THE INVENTION

The "storage tank" herein is a storage tank which is thermally isolated or installed in a suitable cold box and used for storing a cryogenic liquid product of an air separation apparatus, and may be a liquid oxygen storage tank, a liquid nitrogen storage tank or a liquid argon storage tank. During normal operation of the air separation apparatus, a portion of the cryogenic liquid product produced is accumulated and stored in the storage tank as a backup.

The "cryogenic liquid pump", as a constituent part of the air separation apparatus, is used to circulate the cryogenic liquid product of the air separation apparatus, or extract the cryogenic liquid product from the storage tank and pressurize same for entry into a heat exchanger, and a pressurized gas product resulting from vaporization is delivered to the user. The "speed-adjustable cryogenic liquid pump" herein is driven by a variable speed motor, wherein a rotation speed of the variable speed motor is changed using the method of changing the number of poles of the motor, the voltage, current or frequency thereof, etc.; the variable speed motor operates continuously within the range of 10%-100% of a nominal rotation speed, in order to adapt to changes in demand of a cryogenic liquid pump load, and drives the cryogenic liquid pump to operate continuously within a nominal rotation speed range. The faster the rotation speed of the motor, the higher the cryogenic liquid product pressure obtained by conversion of mechanical energy of the motor by the cryogenic liquid pump.

The "fluid circuit" herein is a pipeline for extracting the cryogenic liquid product from the storage tank, and sending same back to the storage tank via the speed-adjustable cryogenic liquid pump and a liquid pump back-flow control valve. In the prior art, in a cold standby state, a small amount of the portion of the cryogenic liquid product that is extracted from the storage tank and circulated back to the storage tank will be vaporized and released into the air, resulting in a loss of liquid and energy.

The "delivery pipeline" herein is a pipeline which extracts the cryogenic liquid product from the storage tank and is connected to a product supply pipeline of the user via the speed-adjustable cryogenic liquid pump and a liquid pump outlet control valve. A vaporizer, located between the liquid pump outlet control valve and the product supply pipeline of the user, may be installed on the delivery pipeline, and used to vaporize the pressurized cryogenic liquid product, so as to provide a pressurized gas product. The vaporizer may be an air bath vaporizer, or one of various types including a water bath vaporizer.

The "product supply pipeline of the user" herein at least comprises a first product supply pipeline and a second product supply pipeline; the delivery pipeline is connected to the first product supply pipeline and the second product supply pipeline separately, and an operating pressure of the first product supply pipeline is lower than an operating pressure of the second product supply pipeline.

In a cold standby state, when the air separation apparatus shuts down or the operation thereof slows down, the cryogenic liquid pump driven by the variable speed motor changes from low-speed running to high-speed running; the cryogenic liquid product is extracted from the storage tank and passes through the cryogenic liquid pump and the liquid pump outlet control valve; the cryogenic liquid product is pressurized to the required high pressure, and is vaporized by heat exchange to form a high-pressure gas, such as gaseous oxygen to be supplied to the user. In the prior art, there is only one user product supply pipeline for supplying a high-pressure product.

Taking the prior art as a starting point, the first product supply pipeline is added in order to realize the function of supplying the cryogenic liquid product, which was originally extracted from the storage tank and sent back to the storage tank via the speed-adjustable cryogenic liquid pump and the liquid pump back-flow control valve, to the user as a low-pressure product; during normal operation of the air separation apparatus, the cryogenic liquid product extracted from the storage tank is pressurized via the speed-adjustable cryogenic liquid pump running at a low speed, and delivered to the first product supply pipeline via the delivery pipeline.

At the same time, the present invention still ensures the advantage of rapid startup of the cryogenic liquid pump from the cold standby state. The supply pipeline used to supply a high-pressure product in the prior art is defined as the second product supply pipeline; during temporary operation when the air separation apparatus shuts down or the operation thereof slows down, the cryogenic liquid product extracted from the storage tank is pressurized via the speed-adjustable cryogenic liquid pump running at a high speed, and delivered to the second product supply pipeline via the delivery pipeline.

The "depressurization device" herein is a device which, by means of adjustment, reduces an inlet pressure to a certain required outlet pressure and, relying on the energy of a fluid itself, causes the outlet pressure to automatically remain stable. From the perspective of fluid mechanics, the depressurization device is a throttle element in which local resistance can change, i.e. flow speed and fluid kinetic energy can be changed by changing a throttle area, causing different pressure losses, and thereby achieving the objective of depressurization. Then, relying on adjustment by a control and adjustment system, fluctuation of pressure after the depressurization device is balanced with a spring force, such that the pressure after the depressurization device stays constant within a certain error range. Herein, the depressurization device may be a pressure relief valve, for depressurizing the cryogenic liquid product, sent out by the speed-adjustable cryogenic liquid pump and having a pressure higher than the operating pressure of the first product supply pipeline, to the operating pressure of the first product supply pipeline.

The "vaporizer" herein is a heat exchange apparatus in which a gas in liquid state is heated until it vaporizes and turns into a gas. Heating may be indirect (steam vaporizer, water bath vaporizer, air bath vaporizer or electrically heated vaporizer), or direct (hot gas or submerged combustion). The vaporizer used in an air separation apparatus backup system is generally an air bath vaporizer or a water bath vaporizer.

FIG. 1 is a schematic diagram of the connection of the constituent parts of a system for supplying a backup product in an air separation apparatus. A system for supplying a backup product in an air separation apparatus comprises a storage tank 1 for storing a cryogenic liquid product; a speed-adjustable cryogenic liquid pump 2, which pressurizes the cryogenic liquid product sent out from the storage tank 1; a liquid pump back-flow control valve 3, and a fluid circuit 4 for extracting the cryogenic liquid product from the storage tank 1 and sending same back to the storage tank 1 via the speed-adjustable cryogenic liquid pump 2 and the liquid pump back-flow control valve 3; a liquid pump outlet control valve 5, and a delivery pipeline 6 which extracts the cryogenic liquid product from the storage tank 1 and is connected to a product supply pipeline of a user via the speed-adjustable cryogenic liquid pump 2 and the liquid pump outlet control valve 5; and the product supply pipeline of the user located downstream of the delivery pipeline 6.

The product supply pipeline of the user at least comprises a first product supply pipeline 7 and a second product supply pipeline 8; the delivery pipeline 6 is connected to the first product supply pipeline 7 and the second product supply pipeline 8 separately, and an operating pressure of the first product supply pipeline 7 is lower than an operating pressure of the second product supply pipeline 8.

The first product supply pipeline 7 comprises at least one depressurization device 9, for depressurizing the cryogenic liquid product, sent out by the speed-adjustable cryogenic liquid pump 2 and having a pressure higher than the operating pressure of the first product supply pipeline 7, to the operating pressure of the first product supply pipeline 7.

A vaporizer 10, located between the liquid pump outlet control valve 5 and the product supply pipeline of the user, is installed on the delivery pipeline 6.

Embodiment 1

In the air separation apparatus, air is separated to produce the cryogenic liquid product, which is delivered and stored in the storage tank 1. During normal operation of the air separation apparatus, the cryogenic liquid product extracted from the storage tank 1 is pressurized via the speed-adjustable cryogenic liquid pump 2 running at a low speed, and the liquid pump back-flow control valve 3 is closed, such that all of the cryogenic liquid product at a low pressure is delivered to the product supply pipeline of the user via the delivery pipeline 6. The delivery pipeline 6 comprises the liquid pump outlet control valve 5, and a vaporizer 10 located between the liquid pump outlet control valve 5 and the product supply pipeline of the user; vaporization takes place by heat exchange in the vaporizer 10 to form a low-pressure gas, such as low-pressure gaseous oxygen to be supplied to the user. Ideally, the speed-adjustable cryogenic liquid pump is driven by a variable speed motor; the rotation speed of the variable speed motor must be adjusted according to the operating pressure of the first product supply pipeline, such that the cryogenic liquid pump runs at a low speed, pressurizing the cryogenic liquid product to a pressure approximately equal to the operating pressure of the first product supply pipeline. If the low pressure is greater than the operating pressure of the first product supply pipeline, depressurization to the pressure of the first product supply pipeline is necessary; if the low pressure is precisely equal to the operating pressure of the first product supply pipeline, delivery to the first product supply pipeline is carried out directly. Since the operating pressure of the first product supply pipeline is lower than the operating pressure of the second product supply pipeline, a gas product at a low pressure will not be delivered to the second product supply pipeline.

Compared with the prior art, this embodiment makes full use of the low-speed running of the speed-adjustable cryogenic liquid pump when in the cold standby state, realizing the function of supplying a low-pressure product to the user, reducing the energy loss associated with the cryogenic liquid pump being in the cold standby state on a long-term basis, and at the same time avoiding the release of the cryogenic liquid product caused by this portion of the cryogenic liquid product being circulated back to the storage tank.

Embodiment 2

In the air separation apparatus, air is separated to produce the cryogenic liquid product, which is delivered and stored in the storage tank 1. During temporary operation when the air separation apparatus shuts down or the operation thereof slows down, the cryogenic liquid product extracted from the storage tank 1 is pressurized via the speed-adjustable cryogenic liquid pump 2 running at a low speed, and the liquid pump back-flow control valve 3 is closed, such that all of the cryogenic liquid product at a high pressure is delivered to the product supply pipeline of the user via the delivery pipeline 6. The delivery pipeline 6 comprises the liquid pump outlet control valve 5, and a vaporizer 10 located between the liquid pump outlet control valve 5 and the product supply pipeline of the user; vaporization takes place by heat exchange in the vaporizer 10 to form a high-pressure gas, such as high-pressure gaseous oxygen to be supplied to the user. Ideally, the speed-adjustable cryogenic liquid pump is driven by a variable speed motor; the rotation speed of the variable speed motor must be adjusted according to the operating pressure of the second product supply pipeline, such that the cryogenic liquid pump runs at a high speed, pressurizing the cryogenic liquid product to the operating pressure of the second product supply pipeline, for direct delivery to the second product supply pipeline. Since the operating pressure of the first product supply pipeline is lower than the operating pressure of the second product supply pipeline, a gas product at a high pressure must be depressurized and delivered to the first product supply pipeline.

Compared with the prior art, this embodiment ensures the advantage of rapid startup of the cryogenic liquid pump from the cold standby state while also being able to satisfy the user's demand for a high-pressure product and a low-pressure product.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for supplying a backup product using a backup system, the method comprising the steps of:

a. providing the backup system, wherein the backup system comprises:
   i. a storage tank configured to store a cryogenic liquid product, the storage tank having a lower region, a middle region, and an upper region;
   ii. a cryogenic liquid pump in fluid communication with an outlet of the storage tank that is in the lower region of the storage tank, wherein the cryogenic liquid pump is speed adjustable and is also configured to pressurize the cryogenic liquid product sent out from the storage tank to form a pressurized product fluid;
   iii. a delivery pipeline in fluid communication with an outlet of the cryogenic liquid pump, the delivery pipeline having a liquid pump outlet control valve disposed thereon that is configured to control a flow of the pressurized product fluid;
   iv. a first product supply line disposed downstream of the liquid pump outlet control valve and in fluid communication with the delivery pipeline, wherein the first product supply line is configured to have an operating pressure at a first pressure; and
   V. a second product supply line disposed downstream of the liquid pump outlet control valve and in fluid communication with the delivery pipeline, wherein the second product supply line is configured to have an operating pressure at a second pressure, wherein the first pressure is lower than the second pressure;
b. sending the cryogenic liquid product to the storage tank;
c. during normal operation of the air separation apparatus, the method further comprises the steps of:
   i. extracting the cryogenic liquid product from the storage tank and then pressurizing the cryogenic liquid product using the cryogenic liquid pump running at a first speed,
   ii. delivering at least a portion of the pressurized product fluid to the first product supply line at the first pressure; and
   iii. an absence of sending any of the pressurized product fluid to the second product supply line; and
d. during temporary operation when the air separation apparatus shuts down or the operation thereof slows down, the method further comprises the steps of:
   i. extracting the cryogenic liquid product from the storage tank and then pressurizing the cryogenic liquid product using the cryogenic liquid pump running at a second speed that is higher than the first speed, and
   ii. delivering at least a portion of the pressurized product fluid to the second product supply line at the second pressure.

2. The method as claimed in claim 1, wherein the cryogenic liquid pump is driven by a variable speed motor, and when a rotation speed of the variable speed motor is adjusted according to the operating pressure of the first product supply line, the cryogenic liquid pump is caused to run at the first speed, pressurizing the cryogenic liquid product to a pressure approximately equal to the operating pressure of the first product supply line; when the rotation speed of the variable speed motor is adjusted according to the operating pressure of the second product supply line, the cryogenic liquid pump is caused to run at the second speed, thereby pressurizing the cryogenic liquid product to the operating pressure of the second product supply line.

3. The method as claimed in claim 1, further comprising the step of vaporizing, in a vaporizer, the pressurized product fluid to provide a pressurized gas product, wherein the vaporizer is disposed on the delivery pipeline between the liquid pump outlet control valve and the first product supply line and the second product supply line.

4. The method as claimed in claim 3, wherein the vaporizer is an air bath vaporizer or a water bath vaporizer.

5. The method as claimed in claim 1, wherein the first product supply line comprises at least one depressurization device that is configured to depressurize the pressurized product fluid, which is received from the delivery pipeline, to the operating pressure of the first product supply line.

6. The method as claimed in claim 1, wherein the cryogenic liquid product is liquid oxygen, liquid nitrogen or liquid argon.

7. The method as claimed in claim 1, wherein the cryogenic liquid product is produced by the air separation apparatus.

8. A method for supplying a backup product from a backup system of an air separation apparatus, the method comprising the steps of:

providing the backup system, wherein the backup system comprises:
   i. a storage tank configured to store a cryogenic liquid product, the storage tank having a lower region, a middle region, and an upper region;
   ii. a cryogenic liquid pump in fluid communication with an outlet of the storage tank that is in the lower region of the storage tank, wherein the cryogenic liquid pump is speed adjustable and is also configured to pressurize the cryogenic liquid product sent out from the storage tank to form a pressurized product fluid;
   iii. a delivery pipeline in fluid communication with an outlet of the cryogenic liquid pump, the delivery pipeline having a liquid pump outlet control valve disposed thereon that is configured to control a flow of a pressurized product fluid;
   iv. a first product supply line disposed downstream of the liquid pump outlet control valve and in fluid communication with the delivery pipeline, wherein the first product supply line is configured to have an operating pressure at a first pressure; and
   v. a second product supply line disposed downstream of the liquid pump outlet control valve and in fluid communication with the delivery pipeline, wherein the second product supply line is configured to have an operating pressure at a second pressure, wherein the first pressure is lower than the second pressure;

extracting the cryogenic liquid product from the storage tank;

vaporizing at least a portion of the cryogenic liquid product in a vaporizer to form a gaseous product;

determining whether to operate in a normal operating state or a temporary operating state, wherein the normal operating state comprises the steps of:

operating the cryogenic liquid pump in a cold standby state, wherein the cold standby state includes a cold standby flow rate and a cold standby operating pressure; and sending the gaseous product to only the first product supply line at the first pressure such that no gaseous product is sent to the second product supply line during the cold standby state;

wherein the temporary operating state comprises the steps of:

operating the cryogenic liquid pump in a backup state, wherein the backup state includes a backup flow rate and a backup operating pressure, wherein the backup operating pressure is higher than the cold standby operating pressure; and sending the gaseous product to the second product supply line at the second pressure.

9. The method as claimed in claim 8, wherein the cold standby operating pressure is based on the operating pressure at the first pressure and the backup operating pressure is based on the operating pressure at the second pressure.

10. The method as claimed in claim 8, wherein the speed-adjustable cryogenic liquid pump is driven by a variable speed motor.

11. The method as claimed in claim 8, wherein the liquid pump outlet control valve is configured to adjust a flow rate of the pressurized product fluid passing through the delivery pipeline.

12. The method as claimed in claim 8, wherein a liquid pump back-flow control valve can adjust a flow rate of the pressurized product fluid passing through a recycle fluid circuit.

13. The method as claimed in claim 8, further comprising a recycle fluid circuit in fluid communication with the outlet of the cryogenic liquid pump and an inlet of the storage tank, wherein the inlet is the upper region of the storage tank, wherein the recycle fluid circuit is configured to transfer at least a recycled portion of the pressurized product fluid from the outlet of the cryogenic liquid pump into the storage tank, wherein the recycle fluid circuit further comprises a liquid pump back-flow control valve disposed thereon that is configured to control a flow of the recycled portion of the pressurized product fluid.

* * * * *